United States Patent
Egyed (10) Patent No.: US 9,875,188 B1
(45) Date of Patent: Jan. 23, 2018

(54) DYNAMICALLY ADAPTING THE CONFIGURATION OF A MULTI-QUEUE CACHE BASED ON ACCESS PATTERNS

(71) Applicant: Google Inc., Mountain View, CA (US)

(72) Inventor: Zoltan Egyed, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/494,747

(22) Filed: Apr. 24, 2017

Related U.S. Application Data (63) Continuation of application No. 14/874,754, filed on Oct. 5, 2015, now Pat. No. 9,632,946, which is a continuation of application No. 13/745,523, filed on Jan. 18, 2013, now Pat. No. 9,201,804.

(60) Provisional application No. 61/595,513, filed on Feb. 6, 2012.

(51) Int. Cl.
*G06F 12/00* (2006.01)
*G06F 13/00* (2006.01)
*G06F 13/28* (2006.01)
*G06F 12/0893* (2016.01)
*G06F 12/0853* (2016.01)
*G06F 12/0871* (2016.01)
*G06F 12/0888* (2016.01)
*G06F 12/123* (2016.01)

(52) U.S. Cl.
CPC ...... *G06F 12/0893* (2013.01); *G06F 12/0853* (2013.01); *G06F 12/0871* (2013.01); *G06F 12/0888* (2013.01); *G06F 12/123* (2013.01); *G06F 2212/1016* (2013.01); *G06F 2212/282* (2013.01); *G06F 2212/601* (2013.01)

(58) Field of Classification Search
CPC ............... G06F 12/123; G06F 12/0853; G06F 12/0871; G06F 12/0888; G06F 12/0893; G06F 2212/282; G06F 2212/601; G06F 2212/1016
USPC ......................................... 711/129, 130, 118
See application file for complete search history.

(56) References Cited

U.S. PATENT DOCUMENTS 6,269,390 B1   7/2001   Boland
6,701,393 B1   3/2004   Kemeny et al.
(Continued)

OTHER PUBLICATIONS

Linux, "4. 7 Routing Cache," IP Routing, Chapter 4, 2 pages [online] [retrieved on Apr. 4, 2013] Retrieved from the internet <URL:http://linux-ip.net/html/routinq-cache.html>.
(Continued)

*Primary Examiner* — Mark Giardino, Jr.
*Assistant Examiner* — Shane Woolwine
(74) *Attorney, Agent, or Firm* — Fish & Richardson P.C.

(57) ABSTRACT

A multi-queue cache is configured with an initial configuration, where the initial configuration includes one or more queues for storing data items. Each of the one or more queues has an initial size. Thereafter, the multi-queue cache is operated according to a multi-queue cache replacement algorithm. During operation, access patterns for the multi-queue cache are analyzed. Based on the access patterns, an updated configuration for the multi-queue cache is determined. Thereafter, the configuration of the multi-queue cache is modified during operation. The modifying includes adjusting the size of at least one of the one or more queues according to the determined updated configuration for the multi-queue cache.

17 Claims, 7 Drawing Sheets

(56) References Cited

U.S. PATENT DOCUMENTS

| | | | |
|---|---|---|---|
| 8,543,776 B2 * | 9/2013 | Zhong | G06F 11/3648 710/22 |
| 2003/0009553 A1 * | 1/2003 | Benfield | H04L 41/0213 709/224 |
| 2003/0163660 A1 | 8/2003 | Lam | |
| 2003/0236961 A1 | 12/2003 | Qiu et al. | |
| 2008/0294846 A1 | 11/2008 | Bali et al. | |
| 2009/0248976 A1 | 10/2009 | Rotithor | |
| 2010/0191915 A1 * | 7/2010 | Spencer | H04L 47/10 711/129 |
| 2011/0191522 A1 | 8/2011 | Condict et al. | |
| 2012/0166723 A1 | 6/2012 | Araki et al. | |
| 2013/0051216 A1 | 2/2013 | Bisdikian et al. | |

OTHER PUBLICATIONS

Ohn, K., et al., "Affinity-based Dynamic Transaction Routing in Shared Disks Clusters," Citeseer, 2003, 7 Pages.

Rohm, U., et al., "OLAP Query Routing and Physical Design in a Database Cluster," EDBT 2000, LNCS 1777, pp. 254-268.

Zhou et al., The Multi-Queue Replacement Algorithm for Second Level Buffer Caches, 2001, USENIX, Proceedings of the 2001 USENIX Technical Conference, pp. 5-6.

* cited by examiner

DYNAMICALLY ADAPTING THE CONFIGURATION OF A MULTI-QUEUE CACHE BASED ON ACCESS PATTERNS

RELATED APPLICATIONS

This application is a continuation of U.S. patent application Ser. No. 14/874,754 filed Oct. 5, 2015, which is a continuation of U.S. patent application Ser. No. 13/745,523 filed Jan. 18, 2013, which is now issued as U.S. Pat. No. 9,201,804 on Dec. 1, 2015, which claims the benefit of U.S. Provisional Application No. 61/595,513, filed Feb. 6, 2012.

All above identified patents and patent applications are hereby incorporated by reference herein.

BACKGROUND

Field of Disclosure

This invention relates generally to computer caches, and particularly to dynamically adapting the configuration of a multi-queue cache according to the access patterns of the cache.

Description of the Related Art

In modern computer systems, caches are typically employed to reduce the latency of retrieving data. Many different replacement techniques currently exist for managing the operations of a cache. One such technique is known as the multi-queue replacement algorithm. In the multi-queue replacement algorithm, data items are stored in one or more queues based on the usage of the items. As used herein, a cache system employing such a technique will be referred to as a multi-queue cache.

One issue with current multi-queue caches is that the default configurations for the caches are usually not well tuned for the specific environment within which the cache operates. Furthermore, even if the default configurations are initially well tuned, the static nature of the caches means that the caches may not stay well tuned over time. Because of such issues, multi-queue caches often exhibit poor cache performance and hit rates. As such, the deployment of multi-queue caches within computer systems has remained relatively low.

SUMMARY

The above and other issues are addressed by a method, a non-transitory computer-readable storage medium, and a system for dynamically adapting the configuration of a multi-queue cache according to the access patterns of the cache.

Embodiments of the method include configuring a multi-queue cache with an initial configuration, where the initial configuration includes one or more queues for storing data items. Each of the one or more queues has an initial size. After configuring, the multi-queue cache is operated according to a multi-queue cache replacement algorithm. During operation, access patterns for the multi-queue cache are analyzed. Based on the access patterns, an updated configuration for the multi-queue cache is determined. Thereafter, the configuration of the multi-queue cache is modified during operation. The modifying includes adjusting the size of at least one of the one or more queues according to the determined updated configuration for the multi-queue cache.

Embodiments of the computer-readable storage medium store computer-executable instructions for performing the steps described above. Embodiments of the system further include a processor for executing the computer-executable instructions.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
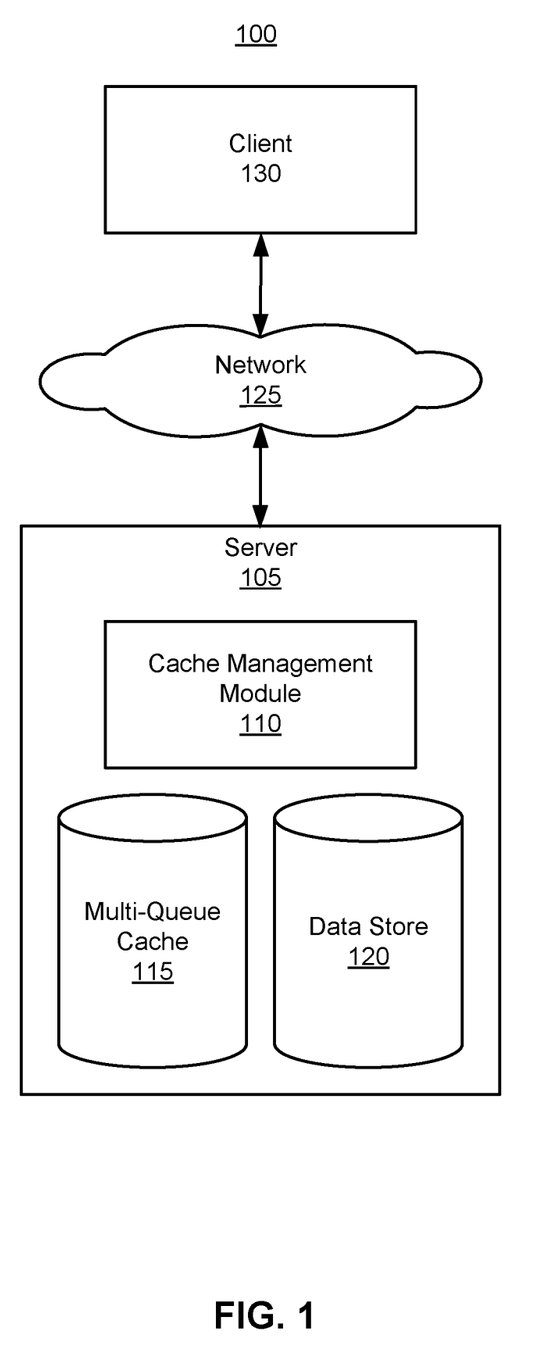
FIG. 1 is a high-level diagram illustrating a typical environment for dynamically adjusting the configuration of a multi-queue cache according to one embodiment.

FIG. 1 is a high-level block diagram illustrating a typical environment 100 for dynamically adjusting the configuration of a multi-queue cache. In one embodiment, the environment 100 can be used to modify, during operation, the configuration of the multi-queue cache based on access patterns for the cache. More specifically, the sizes (which may refer to actual or target sizes) of the various queues in the multi-queue cache and the number of queues employed by the cache may be modified. Referring to FIG. 1, the environment 100 includes a client 130 in communication with a server 105 via a network 125. Only one client 130 and one server 105 are shown in FIG. 1 for purposes of clarity, but those of skill in the art will recognize that typical environments can have hundreds or thousands of clients 130, and can also have multiple systems 105.

The network 125 enables communications between the client 130 and the server 105. In one embodiment, the network 125 uses standard communications technologies and/or protocols. Thus, the network 125 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 125 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 125 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 125 can also include links to other networks such as the Internet.

The client 130 is an electronic device operated by a user for requesting and receiving data from the server 105 via the network 125. For example, the client 130 may request web page content, source code, application data, and/or any other suitable data from the server 105. The client 130 may be any suitable electronic device, such as a computer system (e.g., a laptop, desktop, workstation, server, etc.), a personal digital assistant (PDA), a mobile telephone, a tablet device, etc. The client 130 may additionally execute a suitable operating system, such as Microsoft Windows, Apple OS X, UNIX, a variant of the Linux operating system, etc.

The server 105 stores and sends data to the client 130 via the network 125. As shown in FIG. 1, the server 105 includes a cache management module 110, a multi-queue cache 115, and a data store 120. The data store 120 generally stores data that may be requested by the client 130. The data store 120 may include one or more suitable storage devices, such as one or more hard drives, optical drives, tape-based storage devices, and/or the like.

The multi-queue cache 115 generally stores a portion of the data stored in the data store 120. The server 105 may store the data portion in the multi-queue cache 115 such that the portion is rapidly retrievable. In particular, the multi-queue cache 115 may include one or more suitable storage devices capable of retrieving data relatively faster and/or cheaper than the storage devices of the data store 120. For example, the multi-queue cache 115 may include any suitable variant of random access memory, such as DRAMs, SRAMS, etc.

In one embodiment, the multi-queue cache 115 may be configured to include a logical hierarchy of one or more queues. Each queue may store data items having a particular usage profile or characteristic. As used herein, the usage profile for a data item may refer to the number of times the data item has experienced a cache hit (i.e. the number of times the data item has been accessed while in the cache). As an illustrative example, a first queue may store data items that each have previously experienced one cache hit. A second queue may store data items that have each previously experienced two cache hits.

The cache management module 110 manages the operations of and dynamically adjusts the configuration for the multi-queue cache 115 on an ongoing basis. In one embodiment, the cache management module 110 promotes or demotes data items from one queue to another queue based on the usage of the items. In particular, more frequently accessed items can be promoted up the hierarchy, which makes the data item less likely to be replaced or removed from the cache. Less frequently accessed items can be demoted, which makes the item more likely to be replaced. In this way, the cache management module 110 enables more frequently accessed items to be maintained within the cache over time.

In one embodiment, the cache management module 110 monitors the number of cache hits occurring in the multi-queue cache 115. Based on the number of cache hits, the cache management module 110 adjusts the configuration of the multi-queue cache 115 in order to tune the configuration to better match the access patterns of the cache. The adjustment of the configuration of the multi-queue cache 115 may occur repeatedly as the cache 115 is used.

In one aspect of the cache management module 110, the module 110 may modify the sizes of the queues in the multi-queue cache 115. For example, a queue in the multi-queue cache 115 may be initially configured to store up to three data items. During operation, the cache management module 110 may adjust the size of the queue such that the queue may store up to four data items. In one embodiment, the cache management module 110 may increase the sizes of queues receiving more cache hits at the expense of other queues that are less frequently hit. More specifically, in increasing the sizes of queues receiving relatively more hits, the cache management module 110 may additionally decrease the size of less frequently hit queues in a proportional or near proportional manner.

In another aspect of the cache management module 110, the module 110 may modify the number of queues used in the multi-queue cache 115. For example, the multi-queue cache 115 may initially include three queues. During operation, the cache management module 110 may increase the number of queues from three to four.

By dynamically adjusting the configuration of the multi-queue cache 115, the cache management module 110 enables the cache's operation to become more efficient over time. In particular, by adding additional queues, the cache 115 can be dynamically configured to better distribute the data items of the cache 115 as defined by the cache's access patterns. Additionally, by modifying the sizes of the queues, the cache 115 can be dynamically configured to store more useful data items as also defined by the cache's access patterns. For example, the cache management module 110 can determine that data items having a particular usage profile are more frequently accessed or hit in the cache 115. In response, the cache management module 110 may update the sizes of the queues in the cache 115 such that the cache is able to store more data items having the particular usage profile. By enabling more data items having the usage profile to be stored in the cache 115, the cache management module 110 allows the operation of the cache to be more closely aligned with the access patterns of the cache. As a result, the operation of the cache can become more efficient.

Furthermore, by configuring the cache 115 on an ongoing basis, the cache management module 110 is able to account for access pattern shifts. For example, if the access patterns for the cache 115 shifts from favoring data items having one usage profile to another, the cache management module 110 can automatically adjust the configuration of the cache 115 accordingly.

In one embodiment, the environment 100 may not be a networked environment. More specifically, the environment 100 may not include the client 130 and/or the network 125. In such an embodiment, the server 105 may operate the multi-queue cache 115 to enable the quick retrieval of data used by the server 105 in performing various processes. For example, the server 105 may cache web data in the multi-queue cache 115 for a web browsing application executed by the server 105. The cached web browser data can enable web pages accessed by the server 105 to be rendered more quickly than if the data were retrieved from the data store 120.

Figure 2:
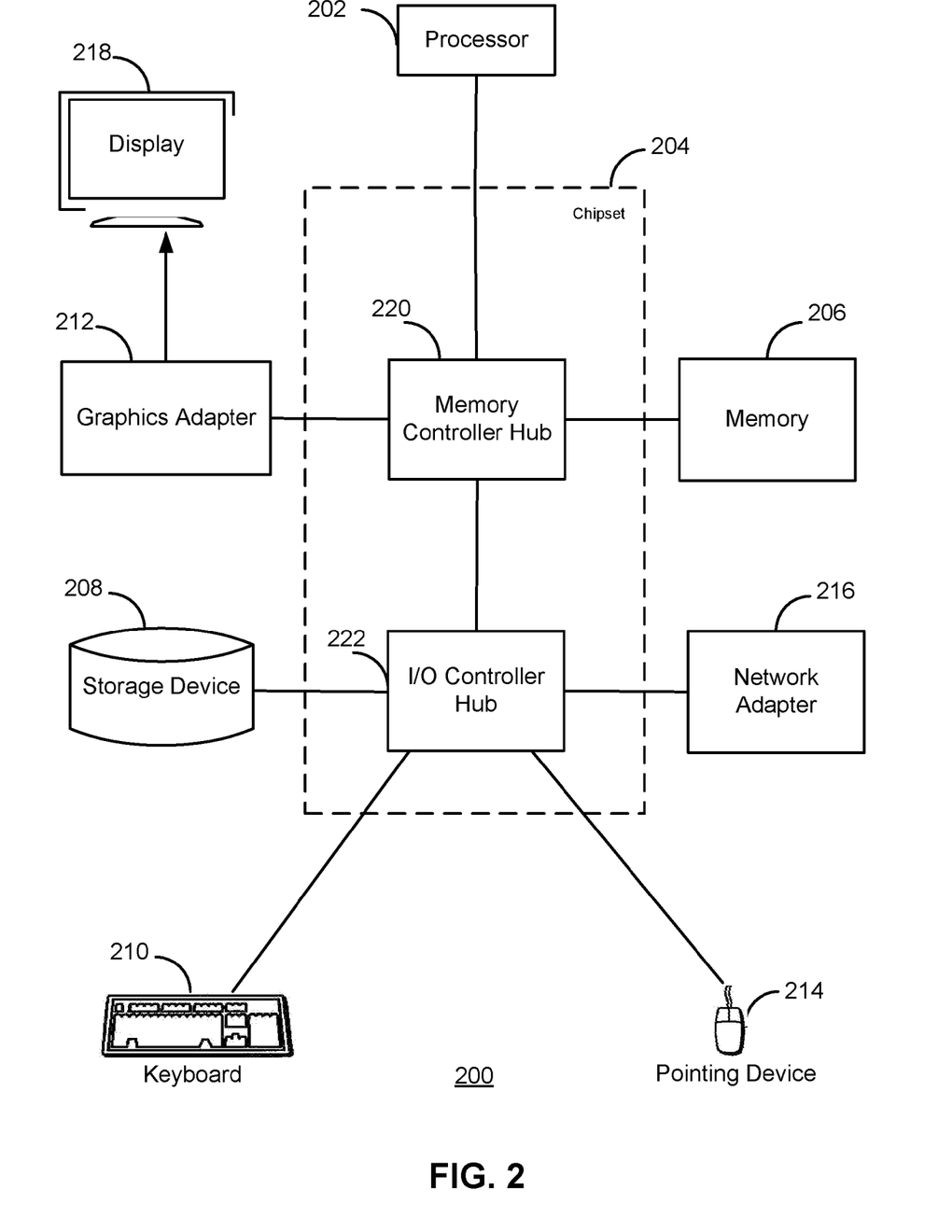
FIG. 2 is a high-level block diagram of a computer system according to one embodiment.

FIG. 2 is a high-level block diagram of a computer 200 for use as the client 130 and/or the server 105 according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of to the chipset 204.

The storage device 208 is a non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 125.

As is known in the art, a computer 200 can have different and/or other components than those shown in FIG. 2. In addition, the computer 200 can lack certain illustrated components. In one embodiment, a computer 200 acting as the server 105 is formed of multiple blade computers and lacks a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Figure 3:
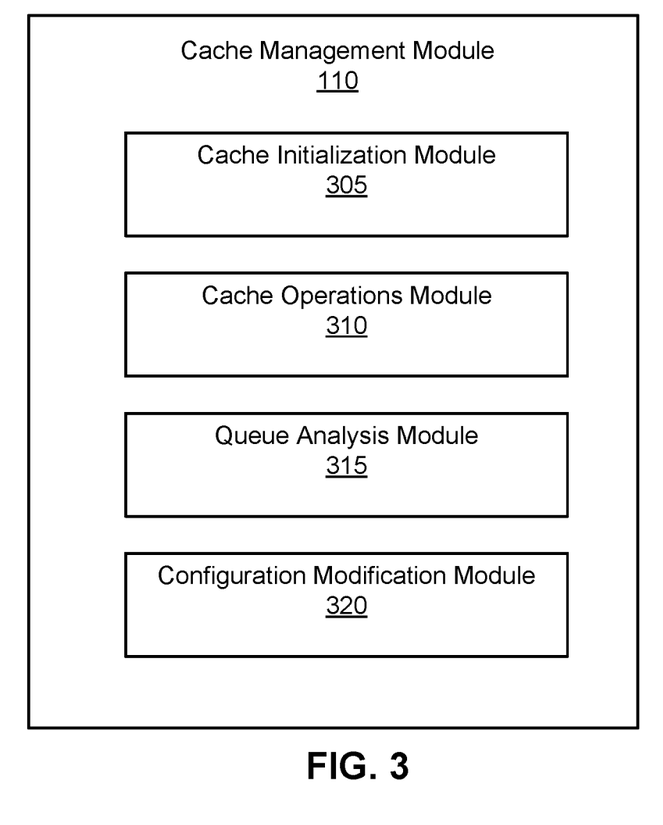
FIG. 3 is a high-level block diagram illustrating a detailed view of modules within a cache management module according to one embodiment.

FIG. 3 is a high-level block diagram illustrating a detailed view of modules within the cache management module 110 according to one embodiment. Some embodiments of the cache management module 110 have different and/or other modules than the ones described herein. Similarly, the functions can be distributed among the modules in accordance with other embodiments in a different manner than is described here. Likewise, the functions can be performed by other entities.

The cache management module 110 includes modules for performing various functions. These modules include a cache initialization module 305, a cache operations module 310, a queue analysis module 315, and a queue modification module 320. The modules 305, 310, 315, and 320 include functionality corresponding to the functionality invoked on the server 105 during the operation and configuration of the multi-queue cache 115.

The cache initialization module 305 initializes the multi-queue cache 115 according to a multi-queue cache replacement algorithm. In particular, the cache initialization module 305 may configure the multi-queue cache 115 to include an initial number of queues for storing data items. Each of the queues may be logically arranged in a queue hierarchy. As an example, the cache operations module 310 may initialize the multi-queue cache 115 to include three queues. Each queue may be logically placed in one of three different hierarchical levels. Each level in the hierarchy of queues may be associated with a particular usage profile. For example, a first level in the hierarchy may include a queue that stores data items that have each experienced one cache hit. A second level in the hierarchy may include a queue that stores data items that have each experienced two cache hits. A third level in the hierarchy may include a queue that stores data items that have each experienced four cache hits. As will be discussed in greater detail, the queue hierarchy enables the movement of stored data items from one queue to another, as specified by the multi-queue cache replacement algorithm.

In one embodiment, the queues of the cache 115 may be initially configured to have identical storage sizes. For example, each of the queues may initially store up to ten data items. In another embodiment, the queues of the cache 115 may have different initial storage sizes. For example, queues lower in the hierarchy may have larger initial storage sizes, which may support improved cache performance at the beginning of operation. Following initialization, the multi-queue cache 115 may begin operation. In one embodiment, each of the queues may be assigned a usage count equal to its initial size. The usage counts for the queues will be used to determine an appropriate size for the queues during operation, as will be described in further detail below.

The cache operations module 310 manages the operations of the multi-queue cache 115. More specifically, the cache operations module 310 may facilitate the storage and replacement of data items from the multi-queue cache 115 according to the multi-queue cache replacement algorithm. In employing the replacement algorithm, the cache operations module 310 periodically promotes or demotes stored data items from one queue of the cache 115 to another queue. The promotion and demotion of the stored data items can be based on the usage of the items. For example, the cache operations module 310 may promote a data item from a lower queue to a higher queue (as specified by the queue hierarchy) after the item has experienced a "cache hit" a certain number of times. As another example, the cache operations module 310 may demote a data item from a higher queue to a lower queue after the item has not been accessed for a certain amount of time, or because the item must be replaced in order to make room for the storage of another data item. If a data item is demoted from the lowest queue in the queue hierarchy, the data item may be removed altogether from the multi-queue cache 115. In this way, the cache operations module 310 allows more useful data items to be maintained in the cache 115 while less useful data items can be replaced over time. In one embodiment, the cache operations module 310 manages the operations of each individual queue according to a suitable variant of the least recently used (LRU) replacement algorithm. In particular, when determining a data item to demote from a queue, the cache operations module 310 selects the least recently used data item for demotion.

The queue analysis module 315 dynamically analyzes access patterns for the multi-queue cache 115 and determines updated configurations for the cache 115. More specifically, the queue analysis module 315 monitors the access patterns of the cache 115 by identifying a number of cache hits occurring in the cache 115. In particular, the queue analysis module 315 may identify, for each cache hit, an access to a data item stored in the cache 115. The queue analysis module 315 may also identify the specific queue in which the accessed data item is stored.

In one embodiment, responsive to identification of a cache hit or after some number of cache hits, the queue analysis module 315 determines updated sizes for the queues in the cache 115. In making such a determination, the queue analysis module 315 determines an updated usage count for the queue in which the cache hit(s) occurred. As used herein, a usage count may indicate how many times a particular queue has experienced a cache hit. In one embodiment, the updated usage count $c_{a,new}$ may be calculated using the following formula:

$$c_{a}, \text{new} = c_a + \min\left(1, \frac{N}{n * c_a}\right) \quad \text{Formula A}$$

In the formula above, an updated usage count is calculated by summing the previous usage count with a change value. More specifically, the value $c_a$ is representative of a previous usage count for the queue experiencing the cache hit. The value of the function $$\min\left(1, \frac{N}{n * c_a}\right)$$

is representative of a change value for the usage count. The value N is representative of the total size (e.g., number of total data entries that may be stored) of the multi-queue cache 115. The value n is representative of the number of queues of the multi-queue cache 115.

After determining the updated usage count for the queue that experienced the cache hit, the queue analysis module 315 computes an updated size for each queue in the cache 115. In one embodiment, the sizes of the queues can be computed such that the queues are able to fit within the multi-queue cache 115. The updated size for each queue can be determined using the following formula:

$$\text{Size of Queue}_i = g\left(c_i * \left(\frac{N}{\sum_{x=1}^{n} c_x}\right)\right) \quad \text{Formula B}$$

In formula B above, the size of each queue is determined by multiplying the current usage count $c_i$ for a given queue by a normalization factor, which normalizes the size of the queue in order to compensate for the change in the usage count for the queue experiencing the cache hit. A function can thereafter be performed on the result to obtain an integer value representative of the new size of the queue. Referring more specifically to formula B, the value N is representative of the total size of the multi-queue cache 115. The value of the summation $$\sum_{x=1}^{n} c_x$$

is representative of the total sum of the current usage counts for the n queues of the cache 115. The value $c_i$ is representative of the current usage count for a given queue whose updated size is to be calculated. It should appreciated that the current usage count for the queue that experienced the cache hit is the computed updated usage count $c_{a,new}$. The function g is representative of a function for computing an integer value, such as a rounding or floor function. An integer value for the size of the queue may be computed in order to obtain a value that is usable by the queue modification engine 320 to modify the configuration of the cache 115, as will be described below.

In one embodiment, the queue analysis module 315 additionally determines whether the number of queues in the cache 115 should be increased. In particular, the queue analysis module 315 can periodically or continuously determine whether the size of the highest queue in the queue hierarchy of the cache 115 exceeds a threshold size. In one implementation, the queue analysis module 310 may perform such a determination after the updated sizes for the queues are determined. In one embodiment, the threshold size may be a predetermined size input by an operator of the server 105. In another embodiment, the threshold size may be based on a size relationship requirement input by the operator of the server 105. Illustratively, a size relationship requirement may specify that the highest queue in the hierarchy cannot exceed two times the average size of the queues in the cache 115.

If the queue analysis module 315 determines that the size of the highest queue exceeds the threshold size, the analysis engine 315 determines that the cache 115 is to be modified to include an additional queue. In one embodiment, the additional queue may be logically arranged above the highest queue. In one embodiment, the additional queue may be assigned to store data items having a particular usage profile. In one implementation, the additional queue may be assigned to store data items having experienced a number of cache hits that is one or more greater than the number of cache hits experienced by data items of the former highest queue. In an embodiment, the additional queue may be assigned to store data items having experienced a number of cache hits that is twice as much as the number of cache hits experienced by data items of the former highest queue. For example, the former highest queue may be configured to store data items having experienced four cache hits. The additional queue may be configured to store data items having experienced at least eight or more cache hits. It should be appreciated that the former highest queue may have previously been configured to store four or more cache hits. After the addition of the additional queue, the former highest queue may now be configured to store four to seven cache hits. Any data items having experienced eight cache hits would now be promoted to the newly added queue.

Following a determination that an additional queue should be added, the queue analysis module 315 determines updated sizes for each of the queues. More specifically, because an additional queue is being added to the cache 115, the size of each queue (including the newly added queue)

must be adjusted such that the queues are able to fit within the multi-queue cache 115. In determining updated sizes for the queues, the multi-queue cache 115 obtains a preliminary size for the newly added queue by dividing the size N of the multi-queue cache 115 by the total number of queues including the newly added queue. Thereafter, the queue analysis module 315 applies the function g to the preliminary size in order to obtain a size R for the newly added queue. As an example, the queue cache 115 may initially have three queues and a total storage size of twelve data items. In determining a queue size for a newly added queue, the queue analysis module 315 divides the total storage size of twelve data items by four and thereafter applies the aforementioned function g. As a result the newly added queue would be assigned a size of three.

After determining a size for the newly added queue, the queue analysis module 315 determines updated sizes for each of the remaining queues. In one embodiment, the queue analysis module 315 initially calculates a multiplier value by dividing the total size N of the cache 115 by the sum of the total size N of the cache 115 and the initial size R of the newly added queue. Thereafter, the queue analysis module 315 multiplies, for each queue, the calculated multiplier value with the queue's current size. Subsequently, the queue analysis module 315 applies the function g to the resulting value in order to determine the updated size for the queue. In one embodiment, the usage count for each updated queue can be updated to be equal to the newly assigned size of the queue.

The queue modification module 320 dynamically modifies the configuration of the multi-queue cache 115. In one embodiment, the queue modification module 320 modifies the size of one or more queues based on the configuration determinations performed by the queue analysis module 315. In particular, the queue modification module 320 may receive updated queue sizes from the queue analysis module 315. Based on the updated sizes, the queue modification module 320 adjusts the sizes of the queues in the cache 115 during operation of the cache. In one embodiment, the queue modification module 320 can increase the size of a queue such that the queue can store additional data items. The queue modification module 320 can additionally or alternatively decrease the size of a queue. In some instances, when decreasing the size of a queue, the queue modification module 320 may remove one or more data items from the queue. In some embodiments, the queue may remove the data items according to the LRU replacement algorithm. Any data items slated to be removed can be demoted to lower queues or removed altogether from the cache 115 if the demotion is from the lowest queue.

In one embodiment, the queue modification module 320 increases the number of queues in the cache 115 queues based on the configuration determinations performed by the queue analysis module 315. In particular, the queue modification module 320 may receive an indication from the queue analysis module 315 to add an additional queue to the cache 115. The indication may additionally include updated sizes for the cache 115. Based on the indication, the queue modification module 320 adds an additional queue to cache 115. The additional queue can be logically arranged in the highest position in the queue hierarchy of the cache 115. The sizes of the queues in the cache 115 can additionally be updated. For each queue that is reduced in size, the queue modification module 320 may remove one or more data items from the queue. In some embodiments, the queue may remove the data items according to the LRU replacement algorithm. Any data items slated to be removed can be demoted to lower queues or removed altogether from the cache 115.

Figure 4:
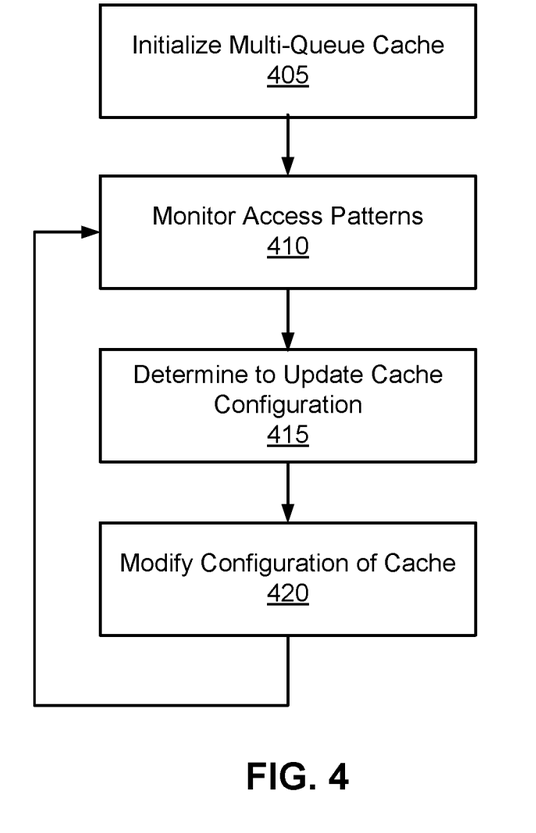
FIG. 4 is a flow chart illustrating a method for analyzing and adjusting the configuration of a multi-queue cache according to one embodiment.

FIG. 4 is a flowchart illustrating a method for analyzing access patterns and modifying the configuration of a multi-queue cache according to one embodiment. Other embodiments can perform the steps of the method in different orders and can include different, additional and/or fewer steps. The method shown in FIG. 4 can be performed by the cache management module 110. In the method, the cache management module 110 begins by initializing 405 the multi-queue cache 115 for operation. In initializing the multi-queue cache 115, the cache management module 110 configures the cache 115 to include an initial number of queues. Each queue can additionally include an initial size. During operation of the multi-queue cache 115, the cache management module 110 monitors 410 the access patterns for the cache. In particular, the cache management module 110 identifies the cache hits occurring in the multi-queue cache 115. Based on access patterns, the cache management module 110 determines 415 whether the configuration for the cache 115 should be updated. If it is determined that the configuration should be updated, the cache management module 110 modifies 420 the configuration of the cache 115. In particular, the cache management module 110 may modify the size and/or number of queues in the cache 115 according to the monitored access patterns. Thereafter, the cache management module 110 continues monitoring the access patterns for the multi-queue cache 115.

Figure 5:
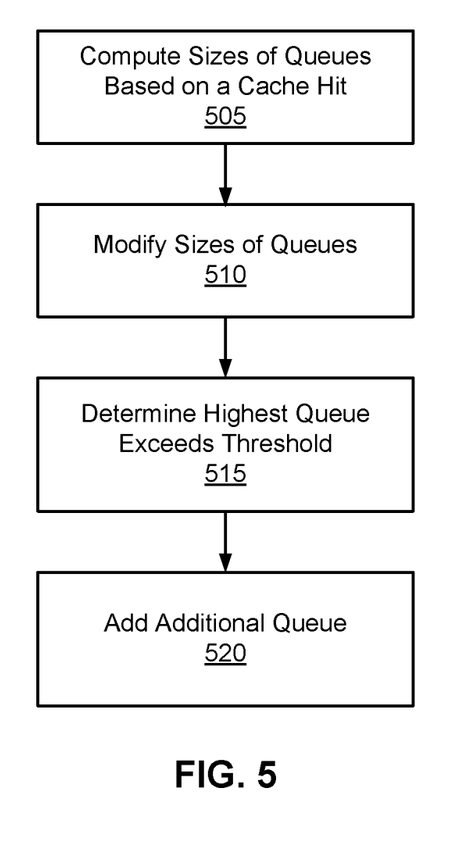
FIG. 5 is a flow chart illustrating a method for adjusting the configuration of a multi-queue cache according to one embodiment.

FIG. 5 is a flowchart illustrating a method for dynamically determining an updated configuration for a multi-queue cache according to one embodiment. Other embodiments can perform the steps of the method in different orders and can include different, additional and/or fewer steps. The method shown in FIG. 5 can be performed by the cache management module 110. In particular, the cache management module 110 may perform the method shown in FIG. 5 to modify the configuration of the cache 115 as specified in the method shown in FIG. 4.

In FIG. 5, the cache management module 110 begins by computing 505 updated sizes for the queues of the multi-queue cache 115. Computation of the sizes of the queues can be based on a cache hit identified by the cache management module 110. In particular, the cache management module 110 updates the usage count for the queue experiencing the cache hit. Thereafter, the cache management module 110 computes updated sizes for the queues using the usage counts for the queues. Upon computing the updated sizes, the cache management module 110 modifies 510 the sizes for the queues. Modification of the size of the queues can occur dynamically during operation of the queue.

Figure 6A:
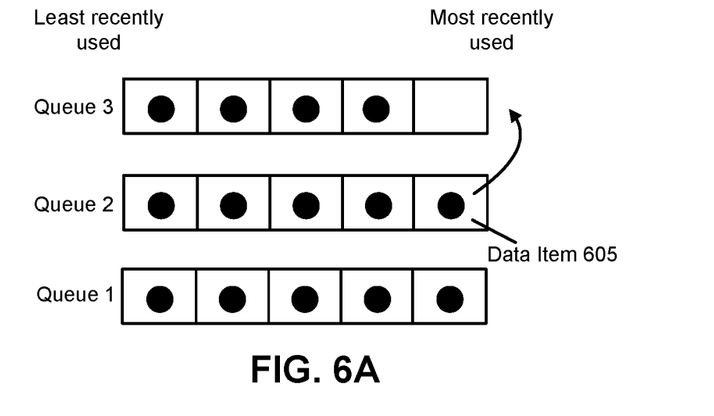
FIGS. 6A and 6B are diagrams illustrating the adjustment of the sizes of the queues in a multi-queue cache according to one embodiment.
Figure 6B:
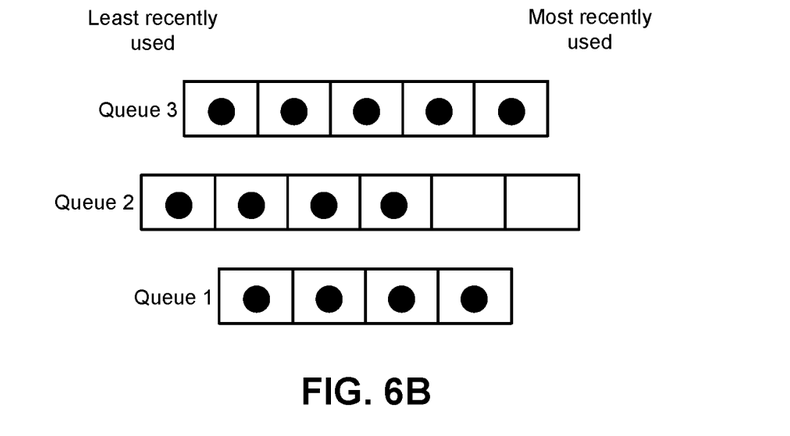

FIGS. 6A and 6B collectively illustrate an example of the dynamic modification of the sizes of the queues in a multi-queue cache. Referring to FIG. 6A, an exemplary hierarchy of queues is shown. As also shown, each queue in the hierarchy stores one or more data items. In FIG. 6A, the data item 605 may experience a cache hit. As such, the data item 605 can be promoted by the cache management module 110 from queue 2 to the higher queue 3. Because a cache hit was experienced in the queue 2, the cache management module 110 increases the usage count for the queue. Thereafter, the cache management module 110 computes updated sizes for the queues in the multi-queue cache. As shown in FIG. 6B, the cache management module 110 may calculate that that queue 2 should be updated from a size of five to a size of six.

The cache management module 110 may additionally determine that the size of queue 1 be reduced from a size of five to a size of four.

Referring again to FIG. 5, following modification of the size of the queues, the cache management module 110 determines 515 whether the highest queue in the multi-queue cache 115 exceeds a size threshold. For example, the cache management module 110 may determine that the highest queue in the multi-queue cache 115 is greater than three times the average size of the queues in the multi-queue cache 115. If it is determined that the multi-queue cache 115 exceeds the size threshold, the cache management module 110 adds an additional queue. In one embodiment, the additional queue can be added above the highest queue in the hierarchy.

Figure 7A:
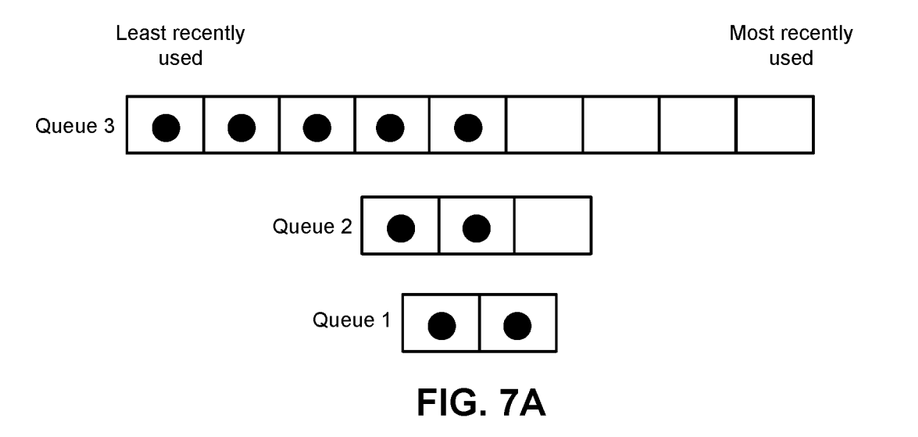
FIGS. 7A and 7B are diagrams illustrating the addition of a queue to a multi-queue cache according to one embodiment.
Figure 7B:
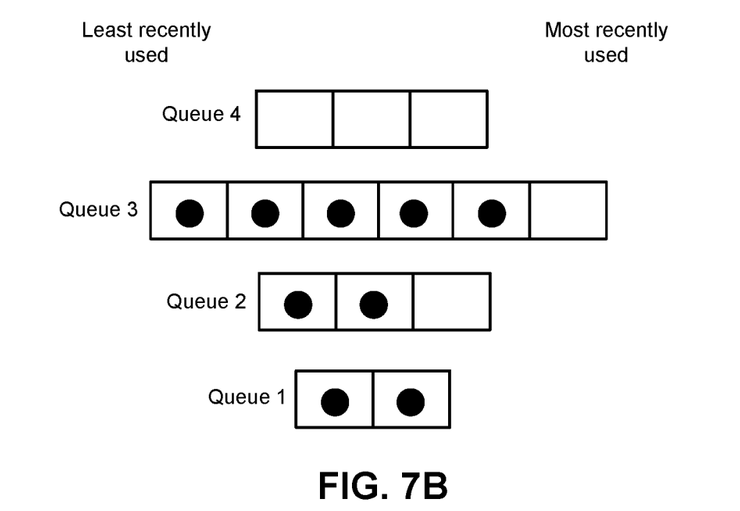

FIGS. 7A and 7B collectively illustrate an example of the addition of a queue to a multi-queue cache in accordance with an embodiment. Referring to FIG. 7A, an exemplary hierarchy of the queues in a multi-queue cache is shown. A threshold size for the multi-queue cache may specify that the size of the highest queue (i.e. queue 3) cannot exceed two times the average queue size, $$\frac{N}{n}.$$

As shown in FIG. 7A, queue 3 has a size of nine while queues 1 and 2 have sizes of two and three respectively. As a result, the cache management module 110 determines that because queue 3 is more than two times the average queue size, $$\frac{N}{n},$$

an additional queue should be added to the multi-queue cache. As shown in FIG. 7B, an additional queue 4 is added to the multi-queue cache. In order to fit additional queue 4 in the multi-queue cache 115, the cache management module 110 accordingly resizes the queues 1, 2, and 3. Thereafter, the multi-queue cache 115 continues operation of the multi-queue cache 115 with four queues.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer implemented method, comprising:
    obtaining size data for a multi-queue cache comprising a plurality of queues for storing data items in a queue hierarchy including a plurality of hierarchical levels;
    determining whether a highest queue in the multi-queue cache satisfies a data size threshold based on the obtained size data, wherein the highest queue is arranged in a logically highest level of the queue hierarchy; and
    in response to determining that the highest queue in the multi-queue cache satisfies the data size threshold, adding an additional queue to the queue hierarchy of the multi-queue cache, wherein the data size threshold is based on an average size of the plurality of queues of the multi-queue cache.

2. The method of claim 1, comprising:
    resizing one or more of the plurality of queues of the multi-queue cache to accommodate the additional queue being added to the queue hierarchy of the multi-queue cache.

3. The method of claim 1, wherein adding an additional queue to the queue hierarchy of the multi-queue cache comprises adding the additional queue at a position in the queue hierarchy above the highest queue.

4. The method of claim 1, wherein the queue hierarchy including a plurality of hierarchical levels is based on a usage profile of data items, each level of the plurality of hierarchical levels including data items having a particular usage profile or characteristic.

5. The method of claim 1, comprising:
    analyzing access patterns for the multi-queue cache; and
    in response to analyzing the access patterns for the multi-queue cache, modifying physical storage capacity of a queue in the plurality of queues based at least on the access patterns for the multi-queue cache.

6. The method of claim 5, wherein modifying the physical storage capacity of a queue in the plurality of queues comprises modifying the physical storage capacity of the queue in accordance with a cache hit ratio associated with one or more of the plurality of queues.

7. A computing system comprising:
    one or more computers; and
    one or more storage units storing instructions that, when executed by the one or more computers, cause the computing system to perform operations comprising:
        obtaining size data for a multi-queue cache comprising a plurality of queues for storing data items in a queue hierarchy including a plurality of hierarchical levels;
        determining whether a highest queue in the multi-queue cache satisfies a data size threshold based on the obtained size data, wherein the highest queue is arranged in a logically highest level of the queue hierarchy; and
        in response to determining that the highest queue in the multi-queue cache satisfies the data size threshold, adding an additional queue to the queue hierarchy of the multi-queue cache, wherein the data size threshold is based on an average size of the plurality of queues of the multi-queue cache.

8. The system of claim 7, the operations comprising:
    resizing one or more of the plurality of queues of the multi-queue cache to accommodate the additional queue being added to the queue hierarchy of the multi-queue cache.

9. The system of claim 7, wherein adding an additional queue to the queue hierarchy of the multi-queue cache comprises adding the additional queue at a position in the queue hierarchy above the highest queue.

10. The system of claim 7, wherein the queue hierarchy including a plurality of hierarchical levels is based on a usage profile of data items, each level of the plurality of hierarchical levels including data items having a particular usage profile or characteristic.

11. The system of claim 7, the operations comprising:
    analyzing access patterns for the multi-queue cache; and
    in response to analyzing the access patterns for the multi-queue cache, modifying physical storage capacity of a queue in the plurality of queues based at least on the access patterns for the multi-queue cache.

12. The system of claim 11, wherein modifying the physical storage capacity of a queue in the plurality of queues comprises modifying the physical storage capacity of the queue in accordance with a cache hit ratio associated with one or more of the plurality of queues.

13. A non-transitory computer-readable storage medium storing computer instructions that, when executed by a computing system, cause the computing system to perform operations comprising:

obtaining size data for a multi-queue cache comprising a plurality of queues for storing data items in a queue hierarchy including a plurality of hierarchical levels;

determining whether a highest queue in the multi-queue cache satisfies a data size threshold based on the obtained size data, wherein the highest queue is arranged in a logically highest level of the queue hierarchy; and in response to determining that the highest queue in the multi-queue cache satisfies the data size threshold, adding an additional queue to the queue hierarchy of the multi-queue cache, wherein the data size threshold is based on an average size of the plurality of queues of the multi-queue cache.

14. The computer-readable storage medium of claim 13, the operations comprising:

resizing one or more of the plurality of queues of the multi-queue cache to accommodate the additional queue being added to the queue hierarchy of the multi-queue cache.

15. The computer-readable storage medium of claim 13, wherein adding an additional queue to the queue hierarchy of the multi-queue cache comprises adding the additional queue at a position in the queue hierarchy above the highest queue.

16. The computer-readable storage medium of claim 13, wherein the queue hierarchy including a plurality of hierarchical levels is based on a usage profile of data items, each level of the plurality of hierarchical levels including data items having a particular usage profile or characteristic.

17. The computer-readable storage medium of claim 13, the operations comprising:

analyzing access patterns for the multi-queue cache; and in response to analyzing the access patterns for the multi-queue cache, modifying physical storage capacity of a queue in the plurality of queues based at least on the access patterns for the multi-queue cache;

wherein modifying the physical storage capacity of a queue in the plurality of queues comprises modifying the physical storage capacity of the queue in accordance with a cache hit ratio associated with one or more of the plurality of queues.

\* \* \* \* \*